May 28, 1935. F. PAVLOVIC ET AL 2,003,053
STORAGE BATTERY TERMINAL CONNECTER
Filed March 29, 1934
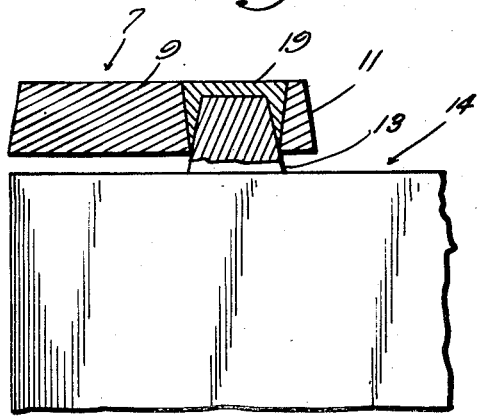
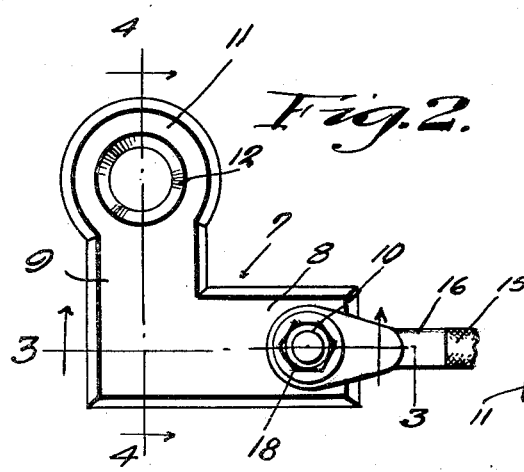
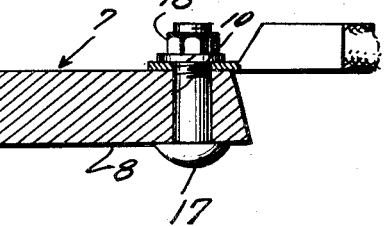
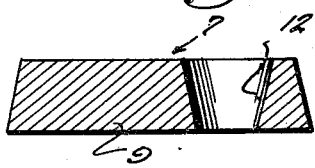
Inventor
Frank Pavlovic
J. G. Sintic
By Clarence A. O'Brien
Attorney Patented May 28, 1935

2,003,053

UNITED STATES PATENT OFFICE 2,003,053

STORAGE BATTERY TERMINAL CONNECTER

Frank Pavlovic and Joseph George Sintic, Cleveland, Ohio

Application March 29, 1934, Serial No. 718,059

1 Claim. (Cl. 173—259)

This invention relates to an improved attachment for a storage battery post.

In the drawing:

Figure 1 is a fragmentary side view of the battery showing the improved connecter attached thereto, said connecter being shown in section and with parts of the post in section.

Figure 2 is a detail top plan view of the connecter.

Figures 3 and 4 are detail sections on the lines 3—3 and 4—4 respectively of Figure 2.

In this drawing, the connecter per se is denoted by the numeral 7, and, as shown it is in the form of a substantially L-shaped flat metal casting embodying complemental right angularly disposed arm portions 8 and 9 respectively. The arm 8 is provided adjacent its end with an opening 10 forming a bolt hole. The arm 9 terminates in an annular enlargement or head which may be conveniently described as an attaching collar 11 and this is provided with a tapered opening 12 to accommodate the correspondingly tapered post 13 on the storage battery 14. The cable is denoted by the numeral 15 and is provided with a metallic adapter 16 connected to the arm 8 by way of a bolt 17 and clamping nut 18 as shown in Figure 2. This provides the desired quick detachable connection between the adapter 16 and the connecter 7.

The L-shaped formation of the unit or connecter 7 is employed so that it may fit nicely on the storage battery and then will remain within the area of the storage battery casing. This L-shaped configuration is a special adaptation factor and permits the battery to be handled conveniently and to be inserted or removed from its holding rack (not shown) without interference from the terminal connecter.

The tapered post hole 12 is slightly larger than the truncated tapered end of the post 13 to permit said hole to surround the post as shown in Figure 3 and to allow it to be permanently joined to the post by lead as shown at 19. When thus attached to the battery post the connecter 7 remains in substantial spaced parallelism with the top of the battery.

We desire to emphasize some of the following features of construction which serve to characterize this unique terminal connecter. It is to be noted that it is made in the form of a single casting shown in Figure 2. It consists of seventy five per cent lead and twenty five per cent antimony. These elements combine to provide the requisite strength and hardness and insure proper conductivity of the current. The L-shaped configuration adapts the connecter to all types of batteries with or without case handle. The tapered opening 12 in the attaching collar 11 is designed to fit negative and positive posts. The collar equipped end of the arm 9 is lead-burned on the battery post as shown in Figure 1 thus insuring appropriate electrical contacts with resultant full benefits of the current supplied by the battery. There is nothing embodied in this arrangement which is susceptible of getting out of order or causing trouble when once it is put in position to stay. Experience has shown that it will practically outlast the battery. By using an attaching bolt 17 for the conductor 15 expeditious and detachable connection between the adapter 16 and connecter is provided. In some instances instead of employing a tool nut 18 a wing nut (not shown) may be employed to obviate the necessity of using tools.

Other features and advantages will doubtless be apparent to persons familiar with accessories in this particular line of endeavor.

It is thought that persons skilled in the art to which the invention relates will be able to obtain a clear understanding of the invention after considering the description in connection with the drawing. Therefore, a more lengthy description is regarded as unnecessary.

Minor changes in shape, size, and rearrangement of details coming within the field of invention claimed may be resorted to in actual practice, if desired.

Having thus described our invention, what we claim as new is:

A device for connecting a conductor to a battery post comprising a body formed of one piece of material and of L-shape to provide a pair of arms extending at right angles to each other, said body having flat upper and lower faces and one arm having a hole extending through its outer end for receiving a bolt for connecting a conductor terminal to said arm and the other arm having an opening in its outer end for receiving a battery post, the outer end of the last mentioned arm being of enlarged circular form, with the hole passing through the circular part, and said hole tapering downwardly, with the small end opening out through the lower face of the body and its large end opening out through the upper face thereof, and said small end of the hole being of slightly greater diameter than the diameter of the battery post, and said hole being adapted to receive the lead which covers the upper part of the battery post.

FRANK PAVLOVIC.
JOSEPH GEORGE SINTIC.